UNITED STATES PATENT OFFICE.

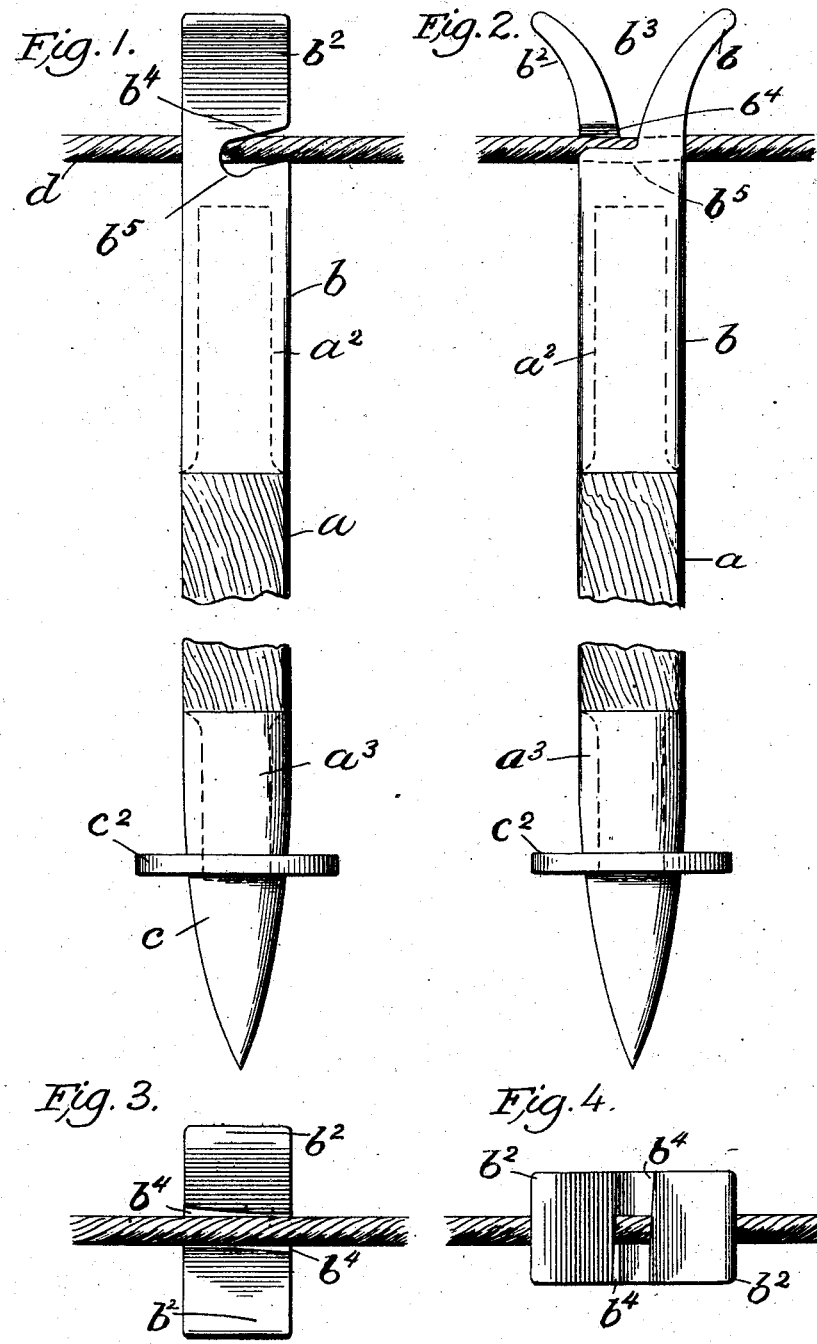

CHESNEY L. JONES, OF HASKELL, NEW JERSEY, ASSIGNOR OF ONE-HALF TO ELMER FREDERICKS, OF WANAQUE, NEW JERSEY.

CLOTHES-LINE PROP.

973,666.  Specification of Letters Patent.  Patented Oct. 25, 1910.

Application filed March 12, 1909. Serial No. 482,962.

*To all whom it may concern:*

Be it known that I, CHESNEY L. JONES, a citizen of the United States, and residing at Haskell, in the county of Passaic, State of New Jersey, have invented certain new and useful Improvements in Clothes-Line Props, of which the following is a specification.

The object of this invention is to provide an improved clothesline prop which is simpel in construction and comparatively inexpensive, and which may be conveniently manipulated for the purpose desired, and which is provided with a head, the construction of which is such that a taut line may be quickly and easily connected therewith and secured thereto, and with these and other objects in view the invention consists in a clothesline prop constructed, as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of my improved clothesline prop and showing a line connected therewith; Fig. 2 a view at right angles to that of Fig. 1; Fig. 3 a plan view of the head of the prop in the position shown in Fig. 1; and, Fig. 4 a view similar to Fig. 3 but showing the prop in the position shown in Fig. 2.

In the practice of my invention, I provide a pole $a$ preferably composed of wood and provided with a socket head $b$ adapted to receive the reduced top end portion of the pole as indicated in dotted lines at $a^2$. The top portion of the head $b$ is oblong and rectangular in plan and consists of two oppositely directed wing members $b^2$ forming a V-shaped notch or recess $b^3$, the side walls of which are flared outwardly, as clearly shown in Fig. 2.

The wing members $b^2$ are provided in the opposite sides thereof and at the bottom of the V-shaped recess $b^3$ with inwardly and downwardly inclined slots or recesses $b^4$, which extend to and pass the transverse center of said wing members and the bottom portions of which are rounded out to form supplemental recesses $b^5$, and the bottom portion of the supplemental recesses $b^5$ are continuous through the head portion of the socket member $b$, and below the bottom of the fork $b^3$, as clearly indicated in Figs. 1 and 2. The pole $a$ is also provided at the bottom end thereof with a pointed and socket member $c$ having midway thereof a flange or rim $c^2$ and the bottom end of which is adapted to receive a reduced extension $a^3$ of the pole $a$, as clearly indicated in Figs. 1 and 2.

In the use of this device, after the line $d$ is stretched, the prop is grasped in the hands in the usual manner and moved upwardly under the line in such manner that said line will pass downwardly into the bottom of the V-shaped recess $b^3$, and at the same time the prop is turned one-quarter of a revolution, while being still pressed upwardly, and in this operation the line enters the downwardly inclined recesses $b^4$ in the opposite side wings $b^2$ and pass into the bottom of said recesses and into the bottom of the supplemental recess $b^5$, as clearly indicated in Fig. 2, and the pointed end of the socket member $c$ is then inserted into the ground and the flange or rim $c^2$ limits the extent to which said socket member may be inserted into the ground. The socket member $c$ is pointed so that it may be easily inserted into the ground, or so that the device may be used on frozen ground or on pavements without slipping.

By means of the construction of the head portion $b$ of my improved prop, the device may be quickly and easily connected with a taut line in such manner that it cannot become detached therefrom, or the line detached from the prop without reversing the operation by which said parts are connected.

Having fully described my invention, what I claim as new and desire to secure by Letters Patent, is:—

A clothesline prop provided with a head having oppositely curved side wings forming a V-shaped recess, said side wings being provided in opposite sides with inwardly and downwardly inclined slots or recesses, the bottom portions of which are connected by a supplemental transverse recess which extends below the bottom of the said V-shaped recess.

In testimony whereof I affix my signature in presence of two witnesses.

CHESNEY L. JONES.

Witnesses:
MORRIS FLOREA,
MAE W. CLINTON.